United States Patent
Kim et al.

(10) Patent No.: US 8,223,712 B2
(45) Date of Patent: Jul. 17, 2012

(54) PHYSICAL DOWNLINK CONTROL CHANNEL RESOURCE-BASED SCHEDULING METHOD AND APPARATUS USED BY BASE STATION

(75) Inventors: Kyung-sook Kim, Daejeon-si (KR); Jae-sheung Shin, Daejeon-si (KR); Hyun-seo Park, Daejeon-si (KR); Young-jick Bahg, Daejeon-si (KR); Yeon-seung Shin, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 449 days.

(21) Appl. No.: 12/607,374

(22) Filed: Oct. 28, 2009

(65) Prior Publication Data

US 2010/0157922 A1 Jun. 24, 2010

(30) Foreign Application Priority Data

Dec. 19, 2008 (KR) ........................ 10-2008-0130630

(51) Int. Cl.
*H04W 4/00* (2009.01)
*H04W 72/04* (2009.01)
*H04B 7/24* (2006.01)
*H04L 27/28* (2006.01)

(52) U.S. Cl. ........ 370/329; 370/252; 370/280; 370/328; 455/450; 455/509; 375/260

(58) Field of Classification Search .......... 370/252–474; 455/63.1–513
See application file for complete search history.

(56) References Cited

U.S. PATENT DOCUMENTS

| 7,573,806 | B2 | 8/2009 | Ihm et al. |
| 2008/0086734 | A1* | 4/2008 | Jensen et al. ................. 718/104 |
| 2009/0298493 | A1* | 12/2009 | Lin ............................ 455/432.1 |
| 2010/0041411 | A1* | 2/2010 | Mallik et al. ................. 455/450 |
| 2010/0135237 | A1* | 6/2010 | Papasakellariou et al. ... 370/329 |
| 2010/0208629 | A1* | 8/2010 | Ahn et al. .................... 370/280 |
| 2011/0201333 | A1* | 8/2011 | Kwon et al. ................. 455/434 |
| 2012/0033643 | A1* | 2/2012 | Noh et al. .................... 370/335 |

FOREIGN PATENT DOCUMENTS

| KR | 10-2005-0106213 A | 11/2005 |
| KR | 10-2006-0115819 A | 11/2006 |
| KR | 10-2008-0065559 A | 7/2008 |

* cited by examiner

*Primary Examiner* — Afsar M. Qureshi
(74) *Attorney, Agent, or Firm* — Kile Park Goekjian Reed & McManus PLLC

(57) ABSTRACT

Provided are a physical downlink control channel (PDCCH)-based scheduling method and apparatus suitable for use by a base station in a long-term evolution (LTE) system. The scheduling method includes: determining an aggregation level of a common search space of a PDCCH by considering channel quality of a plurality of user equipments (UEs); identifying the number of PDCCH candidates and the number of messages, which require allocation of the common search space, based on the determined aggregation level and selecting messages by a smaller number of the number of messages and the number of PDCCH candidates; and allocating PDCCH resources and physical downlink shared channel (PDSCH) resources for the selected messages. In a situation where the PDCCH resources are shared by downlink scheduling information and uplink scheduling information of different UEs, the PDCCH resource-based scheduling method can be used by the base station to efficiently utilize the PDCCH resources.

20 Claims, 3 Drawing Sheets

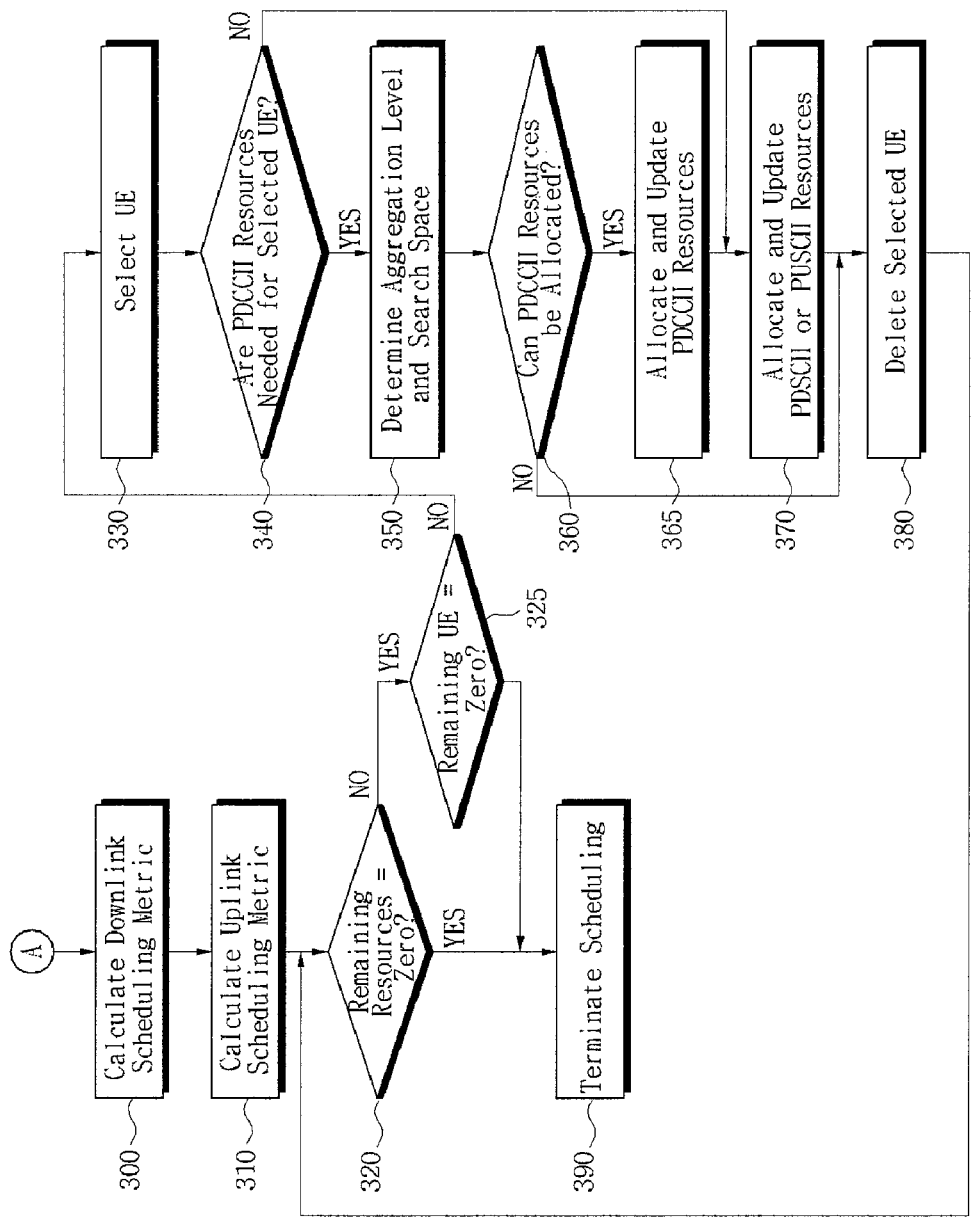

PHYSICAL DOWNLINK CONTROL CHANNEL RESOURCE-BASED SCHEDULING METHOD AND APPARATUS USED BY BASE STATION

CROSS-REFERENCE TO RELATED APPLICATION

This application claims the benefit under 35 U.S.C. §119 (a) of Korean Patent Application No. 10-2008-0130630, filed on Dec. 19, 2008, the disclosure of which is incorporated by reference in its entirety for all purposes.

BACKGROUND

1. Field

The following description relates to the scheduling operation of a base station, and more particularly, to the scheduling operation of a base station in a long-term evolution (LTE) system.

2. Description of the Related Art

A long-term evolution (LTE) system provides a physical downlink control channel (PDCCH) to deliver downlink control information that includes downlink and uplink scheduling information and other control information.

A PDCCH is arranged on an aggregation of one or more successive control channel elements (CCEs), and a plurality of PDCCHs can be transmitted in a single subframe. A third generation partnership project (3GPP) transport stream (TS) 36.211 V8.4.0 defines a PDCCH format as shown in Table 1 below and supports aggregation levels (L) 1, 2, 4, and 8.

TABLE 1

| PDCCH Format | Number of CCEs | Number of Resource-Element Groups | Number of Bits of PDCCH |
| --- | --- | --- | --- |
| 0 | 1 | 9 | 72 |
| 1 | 2 | 18 | 144 |
| 2 | 4 | 36 | 288 |
| 3 | 8 | 72 | 576 |

A user equipment (UE) attempts to decode a common search space for each of the aggregation levels 4 and 8 and attempts to decode a UE-specific search space for each of the aggregation levels 1, 2, 4, and 8. An aggregation level which determines a search space and downlink control information (DCI) which is monitored by a UE in each aggregation space are shown in Table 2 below.

| | Search Space $S_k^{(L)}$ | | | |
| --- | --- | --- | --- | --- |
| Type | Aggregation Level (L) | Number of CCEs | Number ($M^{(L)}$) of PDCCH Candidates | DCI Format |
| UE-Specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

CCEs of the common search space may overlap those of the UE-specific search space. In addition, CCEs of the UE-specific search space for different radio network temporary identifiers (RNTIs) may overlap each other in a $k^{th}$ subframe. Therefore, when transmitting two or more PDCCHs in the same subframe, a base station has to schedule the PDCCHs such that CCEs of each of the PDCCHs do not overlap each other.

PDCCH resources are shared by downlink scheduling information, such as DCI 1 and 2, and uplink scheduling information such as DCI0. Therefore, when allocating physical downlink shared channel (PDSCH) resources and physical uplink shared channel (PUSCH) resources, a medium access control (MAC) scheduler has to consider whether PDCCH resources can be allocated for corresponding downlink scheduling information and corresponding uplink scheduling information.

SUMMARY

The following description relates to a physical downlink control channel (PDCCH)-based scheduling method and apparatus used by a base station, the scheduling method and apparatus being capable of preventing control channel elements (CCEs) of each of a plurality of PDCCHs from overlapping each other when the PDCCHs are transmitted in the same subframe.

According to an exemplary aspect, there is provided, a PDCCH resource-based scheduling method used by a base station which schedules downlink physical resources or uplink physical resources in response to a plurality of downlink scheduling requests or a plurality of uplink scheduling requests. The scheduling method includes: determining an aggregation level of a common search space of a PDCCH by considering channel quality of a plurality of user equipments (UEs); identifying the number of PDCCH candidates and the number of messages, which require allocation of the common search space, based on the determined aggregation level and selecting messages by a smaller number of the number of messages and the number of PDCCH candidates; and allocating PDCCH resources and physical downlink shared channel (PDSCH) resources for the selected messages.

The scheduling method may further include: collecting downlink or uplink scheduling requests from the UEs; calculating a scheduling metric of each of the UEs in response to the collected downlink or uplink scheduling requests; selecting the UEs, which have made the downlink or uplink scheduling requests, in order of highest to lowest scheduling metric and determining whether the PDCCH resources need to be allocated for scheduling execution information of each of the selected UEs; and allocating the PDCCH resources for a UE-specific search space based on the determination result.

According to another exemplary aspect, there is provided a PDCCH resource-based scheduling apparatus used by a base station which schedules downlink physical resources or uplink physical resources in response to a plurality of downlink scheduling requests or a plurality of uplink scheduling requests. The scheduling apparatus includes: an aggregation level determination unit determining an aggregation level of a common search space of a PDCCH by considering channel quality of a plurality of UEs; a message selection unit identifying the number of PDCCH candidates and the number of messages, which require allocation of the common search space, based on the determined aggregation level and selecting messages by a smaller number of the number of messages and the number of PDCCH candidates; and a common scheduling execution unit allocating PDCCH resources for the selected messages.

The scheduling apparatus may further include: a request collection unit collecting scheduling requests from the UEs; a metric calculation unit calculating a scheduling metric of each of the UEs in response to the collected scheduling requests; a UE selection and control channel allocation determination unit selecting the UEs, which made the scheduling requests, in order of highest to lowest scheduling metric and determining whether the PDCCH resources need to be allocated for scheduling execution information of each of the selected UEs; and a UE scheduling execution unit performing a UE scheduling operation by allocating the PDCCH resources for a UE-specific search space corresponding to each of the selected UEs based on the determination result.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain aspects of the invention.

FIGS. 3 and 4 are flowcharts illustrating a scheduling method used by a base station, according to an exemplary embodiment.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 1:
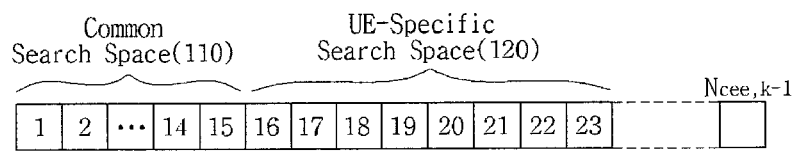
FIG. 1 illustrates an exemplary physical downlink control channel.

FIG. 1 illustrates an exemplary physical downlink control channel (PDCCH).

Referring to FIG. 1, a PDCCH includes $N_{cce,k}$ control channel elements (CCEs) in a $k^{th}$ subframe. Of the $N_{cce,k}$ CCEs, CCEs 0 through 15 form a common search space 110. The common search space 110 contains scheduling information for a radio resource control (RRC) system information message, a paging message, a random access response message, and the like. As shown in Table 2, when an aggregation level (L) is four, four PDCCHs can be simultaneously transmitted in the $k^{th}$ subframe. When the aggregation level is eight, two PDCCHs can be simultaneously transmitted.

A PDCCH carries information about allocation of physical downlink shared channel (PDSCH) resources, information about allocation of physical uplink shared channel (PUSCH) resources, and power control information. Detailed information needed to allocate the PUSCH resources includes a hopping flag, resource block (RB) allocation, a modulation and coding scheme (MCS), transmit power control (TPC), and a radio network temporary identifier (RNTI), and detailed information needed to allocate the PDSCH resources includes RB allocation, MCS, a new data indicator (NDI), a redundancy version (RV), a hybrid automatic repeat request (HARQ) process number, TPC, and RNTI. In addition, detailed information needed to control power includes a TPC bitmap and RNTI.

A third generation partnership project (3GPP) transport stream (TS) 36.211 V8.4.0 defines the following PDCCH allocation procedure. A search space $S_k^{(L)}$ is defined based on an aggregation level of L∈{1,2,4,8} of a PDCCH and are defined as a group of PDCCH is candidates. A CCE corresponding to each PDCCH candidate "$M^{(L)}$" are defined by:

$$L\mathrm{E}\{(Y_k+m) \bmod [N_{cce,k}/L]\}+i,$$

where $N_{cce,k}$ is the total number of CCEs in a $k^{th}$ subframe, "i" (=0, 1, . . . , L−1) is a constant, and "m" (=0, 1, . . . , $M^{(L)}$−1, $M^{(L)}$) is the number of PDCCH candidates that are monitored in a given search space. In the case of a common search space, $Y_k$=0 for an aggregation level (L) of 4 or 8.

The search space $S_k^{(L)}$ may be defined as follows, based on the aggregation level (L):

$$Y_k=(A\cdot Y_{k-1}) \bmod D$$

$$Y_{-1}=n_{RNTI}\neq 0, A=39827, D=65537.$$

As apparent from the above equation ($Y_k$), the search space $S_k^{(L)}$ in the $k^{th}$ subframe is determined by "k" and an RNTI of a UE. As illustrated in FIG. 1, when the aggregation level of UEs 1 and 2 is four in the $k^{th}$ subframe, the UE-specific search space 120 of the UE 1 may match that of the UE2. In this case, if each of the UE1 and UE2 makes both a downlink scheduling request and an uplink scheduling request, four PDCCH resources are required for scheduling information. However, only two PDCCH resources can be allocated for CCEs 16 through 23 of the UE-specific search space 120. Thus, it may be impossible to meet a downlink or uplink scheduling request due to insufficient PDCCH resources. Meanwhile, the common search space 110 and the UE-specific search space 120 may overlap each other.

Figure 2:
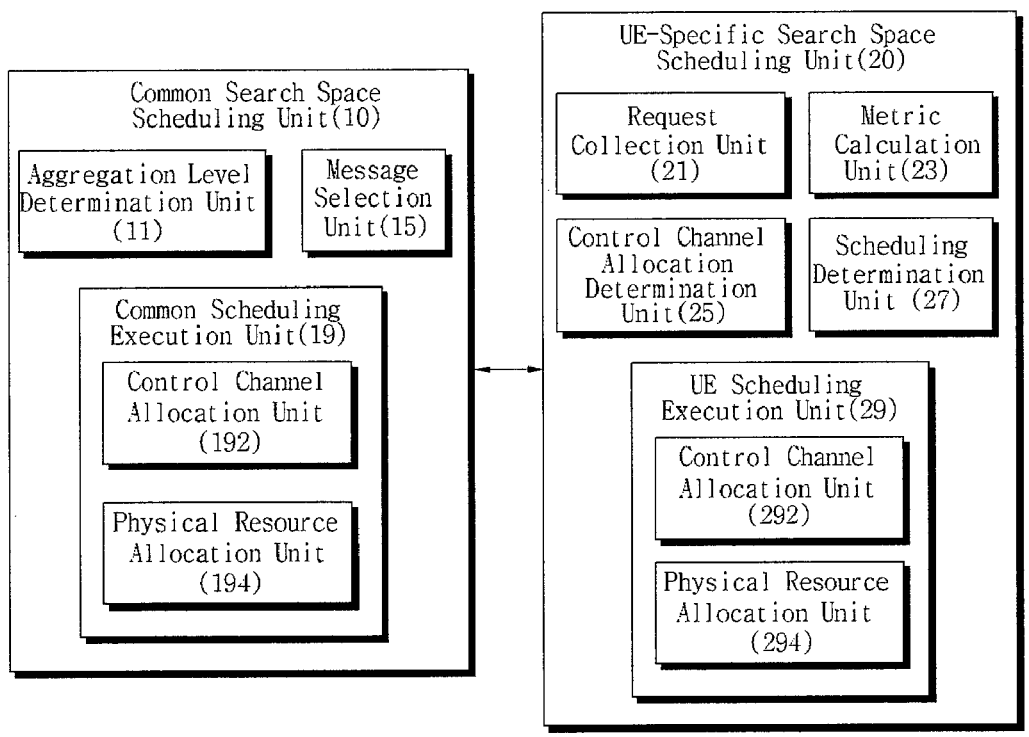
FIG. 2 is a block diagram of a PDCCH resource-based scheduling apparatus used by a base station, according to an exemplary embodiment.

FIG. 2 is a block diagram of a PDCCH resource-based scheduling apparatus used by a base station, according to an exemplary embodiment.

Referring to FIG. 2, the scheduling apparatus according to the current exemplary embodiment includes a common search space scheduling unit 10 which schedules a common search space and a UE-specific search space scheduling unit 20 which schedules a UE-specific search space. Specifically, the scheduling apparatus includes an aggregation level determination unit 11, a message selection unit 15, a common scheduling execution unit 19, a request collection unit 21, a metric calculation unit 23, a UE selection and control channel allocation determination unit 25, a scheduling determination unit 27, and a UE scheduling execution unit 29.

In FIG. 2, the common search space scheduling unit 10 and the UE-specific search space scheduling unit 20 are functionally separated from each other for ease of description. However, in practice they may be physically integrated with each other. In a $k^{th}$ subframe, the scheduling apparatus according to the current exemplary embodiment schedules PDSCH resources in response to a plurality of downlink scheduling requests and schedules PUSCH resources in response to a plurality of uplink scheduling requests.

The aggregation level determination unit 11 determines an aggregation level of a common search space to be four or eight by considering average channel quality of a plurality of UEs being serviced by the base station. As described above, when the aggregation level of the common search space is four, the number of PDCCH candidates is four, and when the aggregation level of the common search space is eight, the number of PDCCH candidates is two.

The message selection unit 15 compares the number of messages that require allocation of the common search space with the number of PDCCH candidates. If the number of messages is greater than the number of PDCCH candidates, the message selection unit 15 selects, in order of priority, two messages when the aggregation level is eight and four messages when the aggregation level is four. The messages that require allocation of the common search space include an RRC system info information message, a paging message, and a random access response message.

The common scheduling execution unit 19 executes scheduling of the common search space. Specifically, the common scheduling execution unit 19 includes a control channel allocation unit 192 and a physical resource allocation unit 194.

When the message selection unit 15 selects messages to which the common search space can be allocated, the control channel allocation unit 192 allocates PDCCH resources for scheduling information of the selected messages and updates the remaining PDCCH resources. The physical resource allocation unit 194 allocates the PDSCH resources for the selected messages and updates the remaining PDSCH resources. In this way, the common scheduling execution unit 19 schedules messages that require resource allocation of the common search space of a PDCCH.

The request collection unit 21 collects downlink or uplink scheduling requests from UEs.

The metric calculation unit 23 calculates a scheduling metric of each UE which makes a downlink scheduling request and calculates a scheduling metric of each UE which makes an uplink scheduling request. A scheduling metric is a value used to select a UE for downlink scheduling or uplink scheduling from a plurality of UEs which make downlink or uplink scheduling requests. The scheduling metric may be calculated using a proportional fair (PF) algorithm that considers the downlink and uplink channel quality and downlink and uplink data amount of each UE.

The UE selection and control channel allocation determination unit 25 selects a UE, which is to be scheduled, based on scheduling metrics calculated by the metric calculation unit 23. In addition, the UE selection and control channel allocation determination unit 25 determines whether PDCCH resources need to be allocated for scheduling information of the selected UE when the selected UE is scheduled. The allocation of the PDCCH resources for scheduling information is not needed in the case of semi-persistent scheduling resource allocation and uplink non-adaptive retransmission. Also, the UE selection and control channel is allocation determination unit 25 determines whether the PDCCH resources for the scheduling information of the selected UE can be allocated for PDCCH candidates in a search space $S_k^{(L)}$.

The scheduling determination unit 27 determines whether a UE-scheduling operation can be performed, based on the number of UEs that have made scheduling requests and based on whether there are remaining PUSCH resources.

In the current exemplary embodiment, the scheduling determination unit 27 may identify the remaining PUSCH resources, the remaining PDSCH resources, and the remaining number of UEs to be scheduled. When there are no remaining PDSCH and PUSCH resources or when there are no remaining UEs, the scheduling determination unit 27 may determine that the UE-scheduling operation cannot be performed.

The scheduling unit 27 may also determine whether the UE-scheduling operation can be performed, based on whether the PDCCH resources for the scheduling information of the selected UE can be allocated for PDCCH candidates in a search space.

The UE scheduling execution unit 29 includes a control channel allocation unit 292 and a physical resource allocation unit 294.

When the UE selection and control channel allocation determination unit 25 determines that the PDCCH resources need to be allocated for the scheduling information of the selected UE during the scheduling of the selected UE, the control channel allocation unit 292 determines whether the PDCCH resources can be allocated. The control channel allocation unit 292 determines an aggregation level based on the channel quality of the selected UE and determines a search space $S_k^{(L)}$ of the selected UE in the $k^{th}$ subframe, based on the determined aggregation level and by using the related equations. When the PDCCH resources can be allocated to the search space $S_k^{(L)}$, the control channel allocation unit 292 allocates the PDCCH resources for the scheduling information of the selected UE.

When the control channel allocation unit 292 determines that allocation of the PDCCH resources is needed and thus allocates the PDCCH resources for a UE-specific search $S_k^{(L)}$, the physical resource allocation unit 294 allocates physical resources. The physical resource allocation unit 294 may also allocate physical resources even when the UE selection and control channel allocation determination unit 25 determines that allocation of the PDCCH resources is not needed.

In the current exemplary embodiment, when the selected UE is a downlink UE ($UE_{DL}$), the physical resource allocation unit 294 allocates the PDSCH resources and updates the remaining PDSCH resources. When the selected UE is an uplink UE ($UE_{UL}$), the physical resource allocation unit 294 allocates the PUSCH resources and updates the remaining PUSCH resources.

The UE scheduling execution unit 29 selects a high-priority UE from a plurality of UEs, which were selected based on the scheduling metrics and had made uplink or downlink scheduling requests, and schedules the selected UE. In this case, the criteria for selection may include downlink channel quality, downlink data amount, uplink channel quality, and uplink data to amount of UEs. When an uplink UE is for uplink adaptive retransmission, allocation of the PDCCH resources is required, and data must be retransmitted within 8 milliseconds (ms). Therefore, UEs for uplink adaptive retransmission are preferentially selected as UEs to be scheduled. In addition, UEs, which request IP multimedia subsystem (IMS) signaling and conversational voice data scheduling, may be preferentially selected since they are ranked high in a bearer priority defined in 3GPP TS 23.302.

Figure 3:
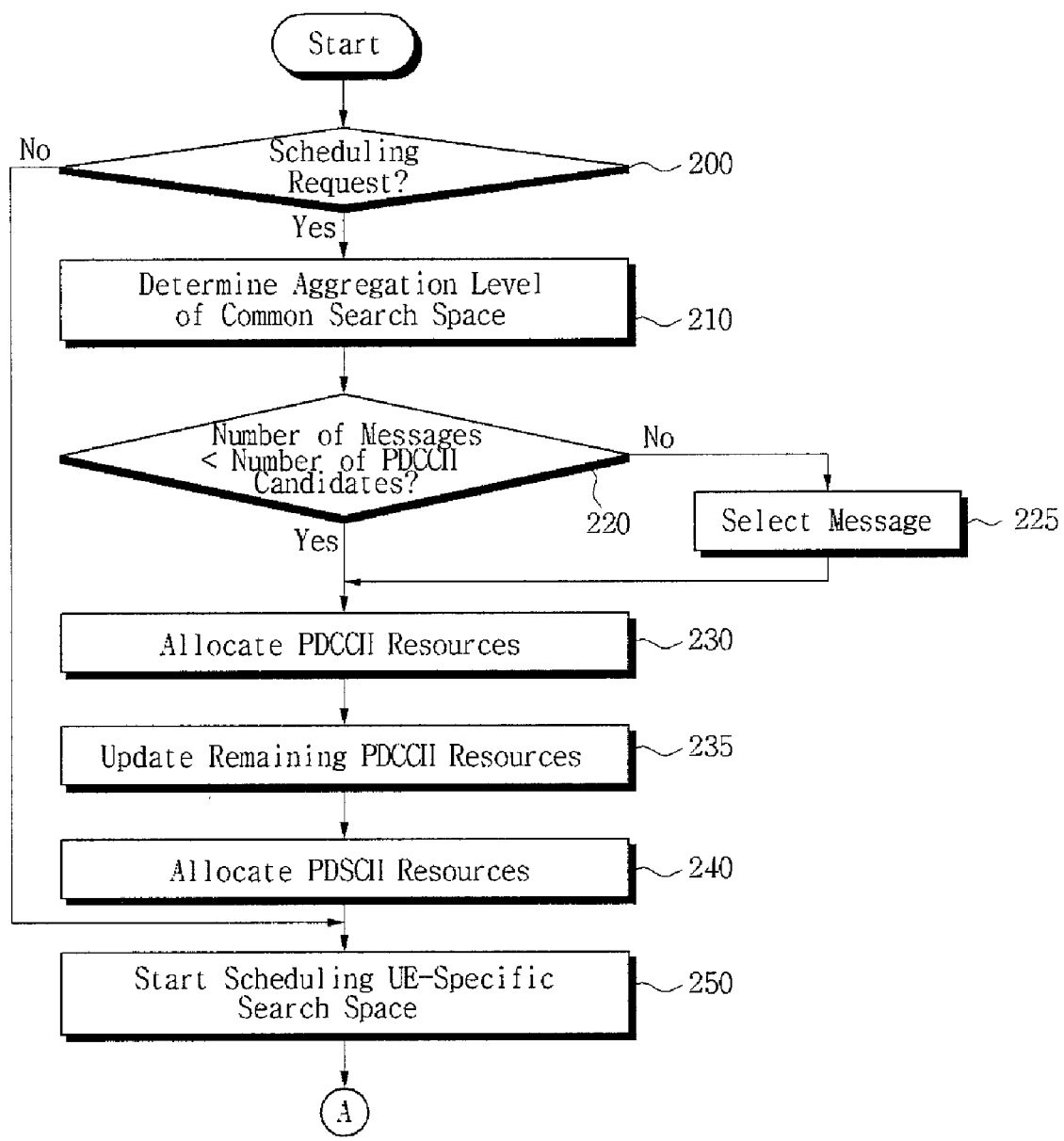

FIGS. 3 and 4 are flowcharts illustrating a scheduling method used by a base station, according to an exemplary embodiment.

Referring to FIGS. 3 and 4, in a $k^{th}$ subframe, a scheduler of a base station begins to schedule PDSCH resources in response to a plurality of downlink scheduling requests and begins to schedule PUSCH resources in response to a plurality of uplink scheduling requests (operation 200).

The scheduler determines an aggregation level of a common search space to be four or eight by considering average channel quality of a plurality of UEs being serviced by the base station (operation 210). As described above, when the aggregation level of the common search space is four, the number of PDCCH candidates is four, and when the aggregation level of the common search space is eight, the number of PDCCH candidates is two.

The scheduler compares the number of messages that require allocation of the common search space with the number of PDCCH candidates (operation 220). If the number of messages is greater than the number of PDCCH candidates, the scheduler selects, in order of priority, two messages when the aggregation level is eight and four messages when the aggregation level is four (operation 225). The messages that require allocation of the common search space include an RRC system information message, a paging message, and a random access response message.

When messages, to which the common search space can be allocated, are selected, the scheduler allocates PDCCH resources for scheduling information of the selected messages (operation 230) and updates the remaining PDCCH resources (operation 235). Then, the scheduler allocates the PDSCH resources for the selected messages and updates the remaining PDSCH resources (operation 240). After the common search space is scheduled, the scheduler performs a scheduling operation that requires resource allocation of a UE-specific search space of a PDCCH (operation 250).

The scheduler performs uplink and downlink scheduling operations that require resource allocation of the UE-specific search space of the PDCCH. The scheduler calculates a scheduling metric of each UE which makes a downlink scheduling request (operation 300) and calculates a scheduling metric of each UE which makes an uplink scheduling request (operation 310). A scheduling metric is a value used to select a UE for downlink scheduling or uplink scheduling from a plurality of UEs which make downlink or uplink scheduling requests. The scheduling metric may be calculated using a PF algorithm that considers the downlink and uplink channel quality and downlink and uplink data amounts of each UE.

When there are no remaining PDSCH and PUSCH resources (operation 320) or when there are no remaining UEs (operation 325), the scheduler terminates its scheduling operation (operation 390).

However, when there are remaining resources and UEs, the scheduler selects a downlink UE ($UE_{DL}$) having a highest downlink scheduling metric (operation 330). Here, if there are no remaining PDSCH resources, no downlink UE ($UE_{DL}$) exists. In addition, the scheduler selects an uplink UE ($UE_{UL}$) having a highest uplink scheduling metric. Here, if there are no remaining PUSCH resources, no uplink UE ($UE_{UL}$) exists.

The scheduler determines whether the PDCCH resources need to be allocated for scheduling information of a UE, when the selected UE is scheduled (operation 340). The allocation of the PDCCH resources for scheduling information is not needed in the case of semi-persistent scheduling resource allocation and uplink non-adaptive retransmission.

When the PDCCH resources do not need to be allocated for the scheduling information of the selected UE during scheduling of the selected UE, the scheduler allocates physical resources for the selected UE. That is, when the selected UE is a downlink UE ($UE_{DL}$), the scheduler allocates the PDSCH resources and updates the remaining PDSCH resources. When the selected UE is an uplink UE ($UE_{UL}$), the scheduler allocates the PUSCH resources and updates the remaining PUSCH resources.

When the PDCCH resources need to be allocated for the scheduling information of the selected UE during scheduling of the selected UE, the scheduler determines an aggregation level based on the channel quality of the selected UE and determines a search space $S_k^{(L)}$ of the selected UE in the $k^{th}$ subframe, based on the determined aggregation level and by using the relevant equations (operation 350).

Then, the scheduler determines whether the PDCCH resources required for the scheduling information of the selected UE can be allocated for PDCCH candidates in the search space $S_k^{(L)}$ (operation 360). Here, when the PDCCH resources cannot be allocated for the selected UE, the selected UE is deleted from a list of UEs to be scheduled (operation 380). When the PDCCH resources can be allocated for the selected UE, the scheduler allocates the PDCCH resources for scheduling information of the selected UE and updates the remaining PDCCH resources (operation 365). When the selected UE is a downlink UE ($UE_{DL}$), the scheduler allocates the PDSCH resources and updates the remaining PDSCH resources. When the selected UE is an uplink UE ($UE_{UL}$), the scheduler allocates the PUSCH resources and updates the remaining PUSCH resources (operation 370).

The scheduler selects a high-priority UE from a plurality of UEs, which were selected based on the scheduling metrics and have made uplink or downlink scheduling requests, and schedules the selected UE. In this case, the criteria for selection may include downlink channel quality, downlink data amount, uplink channel quality, and uplink data amount of UEs. When an uplink UE is for uplink adaptive retransmission, allocation of the PDCCH resources is required, and data must be retransmitted within 8 milliseconds (ms). Therefore, UEs for uplink adaptive retransmission are preferentially selected as UEs to be scheduled. In addition, UEs, which request IP multimedia subsystem (IMS) signaling and conversational voice data scheduling, may be preferentially selected since they are ranked high in a bearer priority list defined in 3GPP TS 23.302.

When the selected UE is a downlink UE ($UE_{DL}$), it is deleted from a list of UEs which have made downlink scheduling requests. When the selected UE is an uplink UE ($UE_{UL}$), it is deleted from a list of UEs which have made uplink scheduling requests (operation 380). In this way, a scheduling operation can be performed by taking PDCCH resource allocation into consideration.

According to the present invention, CCEs of a common search space of a PDCCH defined by a long-term evolution (LTE) system can be prevented from overlapping those of a UE-specific search space of the PDCCH. In addition, in a situation where PDCCH resources are shared by downlink scheduling information and uplink scheduling information of different UEs, a PDCCH resource-based scheduling method which can be used by a base station to efficiently utilize the PDCCH resources is provided.

The scheduling method described above can be written as a computer program. In addition, the computer program can be stored in a computer-readable medium and read and executed by a computer. Examples of the computer readable medium include a magnetic storage medium and an optical recording medium.

While the present invention has been particularly shown and described with reference to exemplary embodiments thereof, it will be understood by those skilled in the art that various is changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A physical downlink control channel (PDCCH) resource-based scheduling method suitable for use by a base station which schedules downlink physical resources or uplink physical resources in response to a plurality of downlink scheduling requests or a plurality of uplink scheduling requests, the scheduling method comprising:

determining an aggregation level of a common search space of a PDCCH by considering channel quality of a plurality of user equipments (UEs);

identifying the number of PDCCH candidates and the number of messages, which require allocation of the common search space, based on the determined aggregation level and selecting messages by a smaller number of the number of messages and the number of PDCCH candidates; and allocating PDCCH resources and physical downlink shared channel (PDSCH) resources for the selected messages.

2. The scheduling method of claim 1, wherein the identifying of the number of PDCCH candidates and the number of messages and the selecting of the messages comprises:
   identifying the number of PDCCH candidates based on the determined aggregation level;
   identifying the number of messages which require allocation of the common search space; and
   comparing the number of PDCCH candidates with the number of messages and selecting, in order of priority, messages by a smaller number of the number of messages and the number of PDCCH candidates when the number of messages is greater than the number of PDCCH candidates.

3. The scheduling method of claim 2, wherein the messages which require allocation of the common search space comprise at least one of a radio resource control (RRC) system information message, a paging message, and a random access response message.

4. The scheduling method of claim 1, further comprising:
   collecting downlink or uplink scheduling requests from the UEs;
   calculating a scheduling metric of each of the UEs in response to the collected downlink or uplink scheduling requests;
   selecting the UEs, which have made the downlink or uplink scheduling requests, in order of highest to lowest scheduling metric and determining whether the PDCCH resources need to be allocated for scheduling execution information of each of the selected UEs; and
   allocating the PDCCH resources for a UE-specific search space based on the determination result.

5. The scheduling method of claim 4, wherein the allocating of the PDCCH resources comprises:
   determining whether the PDCCH resources can be allocated for the UE-specific search space when it is determined that the PDCCH resources need to be allocated; and
   allocating the PDCCH resources for the UE-specific search space when it is determined that the PDCCH resources can be allocated for the UE-specific search space and allocating the PDSCH or PUSCH resources.

6. The scheduling method of claim 5, wherein the allocating of the PDCCH resources and the allocating of the PDSCH or PUSCH resources further comprises:
   determining whether the PDSCH or PUSCH resources can be allocated based on whether the PDCCH resources can be allocated; and
   allocating the PDSCH or PUSCH resources when it is determined that the PDCCH or PUSCH resources and the PDSCH resources can be allocated.

7. The scheduling method of claim 4, further comprising:
   determining whether a scheduling operation can be performed based on the number of UEs, which have made the downlink or uplink scheduling requests, after the collecting of the downlink or uplink scheduling requests; and
   performing the scheduling operation when it is determined that the scheduling operation can be performed.

8. The scheduling method of claim 7, wherein whether the scheduling operation can be performed is determined based on whether there are remaining physical uplink shared channel (PUSCH) or PDSCH resources.

9. The scheduling method of claim 4, wherein in the allocating of the PDCCH resources, the UEs selected based on the calculated scheduling metrics are prioritized based on at least one of downlink channel quality and data amount of the selected UEs and uplink channel quality and data amount of the selected UEs.

10. The scheduling method of claim 9, further comprising:
    generating a list of UEs which have made the downlink or uplink scheduling requests; and
    deleting a high-priority UE, which is selected from the selected UEs, from the generated list.

11. The scheduling method of claim 4, wherein in the allocating of the PDCCH resources, if any one of UEs, which have made the uplink scheduling requests, from among the UEs selected based on the scheduling metrics is a UE for uplink adaptive retransmission, the UE is preferentially selected and scheduled accordingly.

12. The scheduling method of claim 4, wherein in the allocating of the PDCCH to resources if any one of the UEs selected based on the scheduling metrics is a UE for IP multimedia subsystem (IMS) signaling or conversational voice data scheduling, which is ranked high in a bearer priority, the UE is preferentially selected and scheduled accordingly.

13. The scheduling method of claim 4, wherein the selecting of the UEs and the determining of whether the PDCCH resources need to be allocated for the scheduling execution information of each of the selected UEs comprises:
    selecting the UEs, which have made downlink or uplink scheduling requests, in order of highest to lowest scheduling metric;
    determining whether the PDCCH resources need to be allocated for the scheduling execution information of each of the selected UEs;
    determining an aggregation level of the selected UEs search space of a corresponding one of the selected UEs when it is determined that the PDCCH resources need to be allocated for the scheduling execution information of the corresponding one of the selected UEs; and
    determining the UE-specific search space based on the determined aggregation level.

14. The scheduling method of claim 13, wherein in the determining of the aggregation level, the aggregation level is determined by considering channel quality of the corresponding one of the selected UEs.

15. A PDCCH resource-based scheduling apparatus used by a base station which schedules downlink physical resources or uplink physical resources in response to a plurality of downlink scheduling requests or a plurality of uplink scheduling requests, the scheduling apparatus comprising:
    an aggregation level determination unit determining an aggregation level of a common search space of a PDCCH by considering channel quality of a plurality of UEs;
    a message selection unit identifying the number of PDCCH candidates and the number of messages, which require allocation of the common search space, based on the determined aggregation level and selecting messages by a smaller number of the number of messages and the number of PDCCH candidates; and
    a common scheduling execution unit allocating PDCCH resources for the selected messages.

16. The scheduling apparatus of claim 15, further comprising:
    a request collection unit collecting scheduling requests from the UEs;

a metric calculation unit calculating a scheduling metric of each of the UEs in response to the collected scheduling requests;

a UE selection and control channel allocation determination unit selecting the UEs, which have made the scheduling requests, in order of highest to lowest scheduling metric and determining whether the PDCCH resources need to be allocated for scheduling execution information of each of the selected UEs; and a UE scheduling execution unit performing a UE scheduling operation by allocating the PDCCH resources for a UE-specific search space based on the determination result.

17. The scheduling apparatus of claim 16, further comprising a scheduling determination unit determining whether the UE-scheduling operation can be performed based on the number of UEs, which made the scheduling requests, and based on whether there are remaining PUSCH or PDSCH resources.

18. The scheduling apparatus of claim 16, further comprising a scheduling determination unit determining whether the UE-scheduling operation can be performed based on whether the PDCCH resources need to be allocated for the scheduling execution information of each of the selected UEs.

19. The scheduling apparatus of claim 16, wherein the UE selection and control channel allocation determination unit prioritizes the UEs, which were selected based on the calculated scheduling metrics, based on at least one of downlink channel quality and data amount and uplink channel quality and data amount of the selected UEs.

20. The scheduling apparatus of claim 16, wherein if any one of UEs, which have made uplink scheduling requests, from among the UEs selected based on the scheduling metrics is a UE for uplink adaptive retransmission, the UE selection and control channel allocation determination unit preferentially selects the UE and performs the UE scheduling operation, and if any one of the UEs selected based on the scheduling metrics is a UE for IP multimedia subsystem (IMS) signaling or conversational voice data scheduling, which is ranked high in a bearer priority, the UE selection and control channel allocation determination unit preferentially selects the UE.

* * * * *